Nov. 14, 1933.  E. WILDHABER  1,935,220
METHOD OF AND MEANS FOR PROJECTING PICTURES
Filed July 5, 1928  3 Sheets-Sheet 1
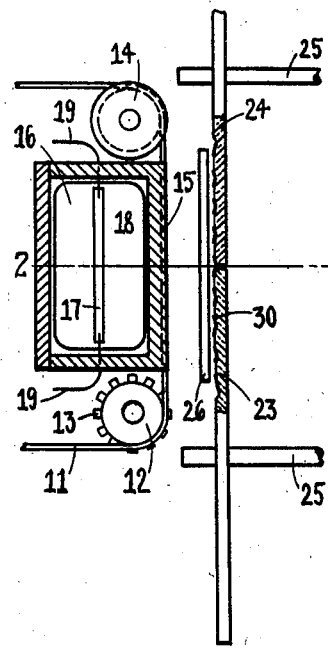
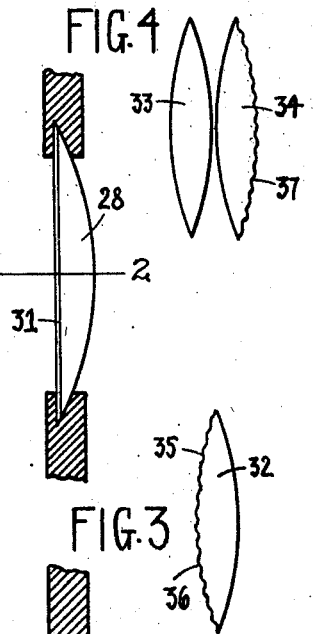
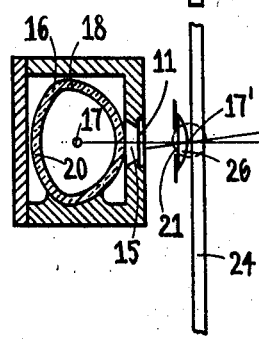
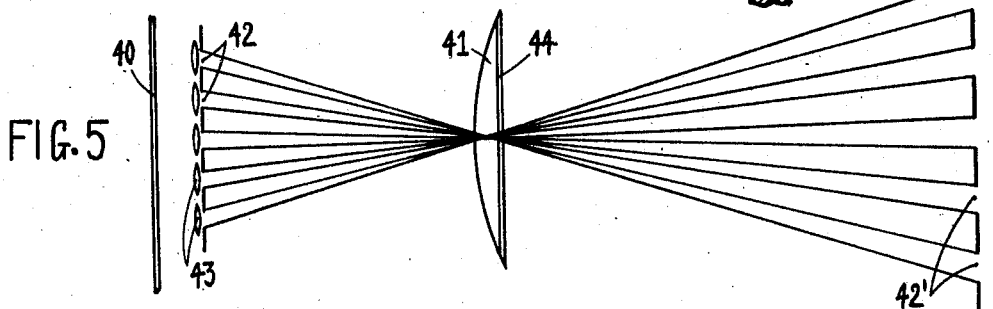
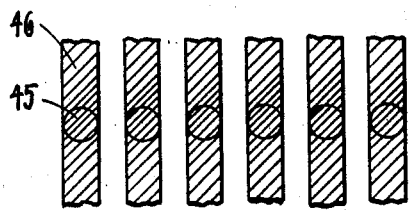
INVENTOR
Ernest Wildhaber Nov. 14, 1933.  E. WILDHABER  1,935,220
METHOD OF AND MEANS FOR PROJECTING PICTURES
Filed July 5, 1928   3 Sheets-Sheet 2
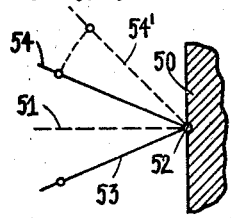
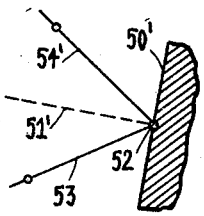
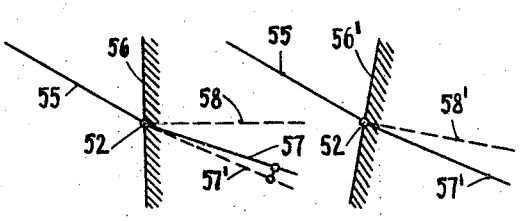
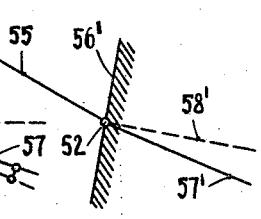
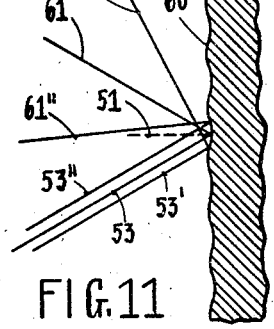
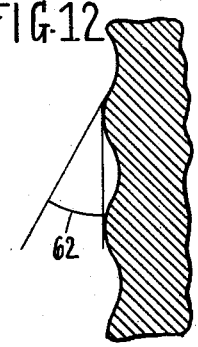
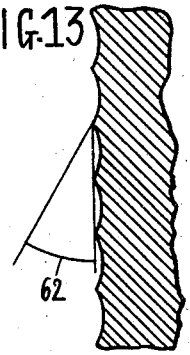
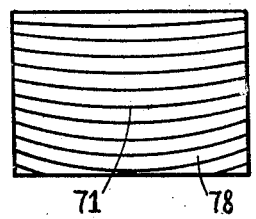
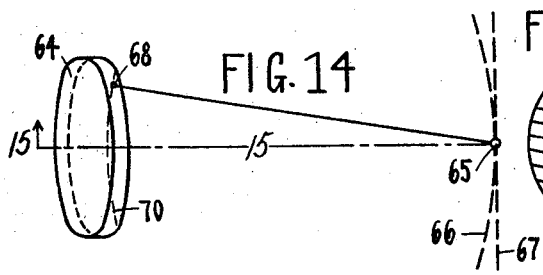
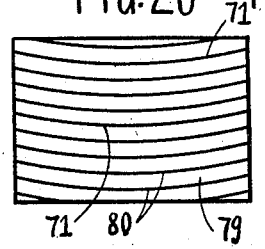
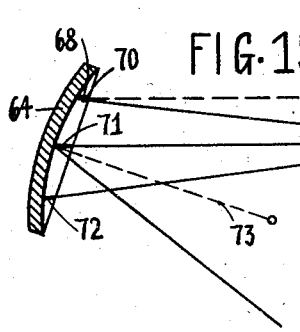
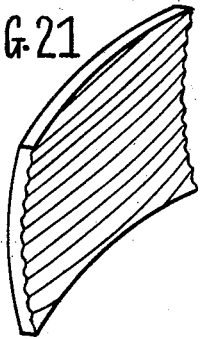
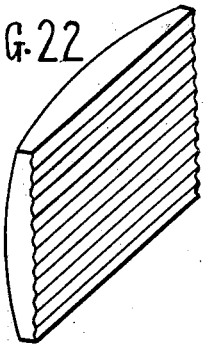
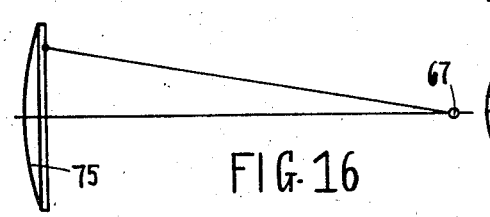
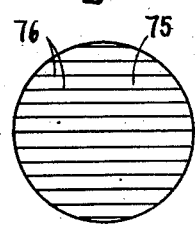
INVENTOR
Ernest Wildhaber Nov. 14, 1933.   E. WILDHABER   1,935,220
METHOD OF AND MEANS FOR PROJECTING PICTURES
Filed July 5, 1928   3 Sheets-Sheet 3
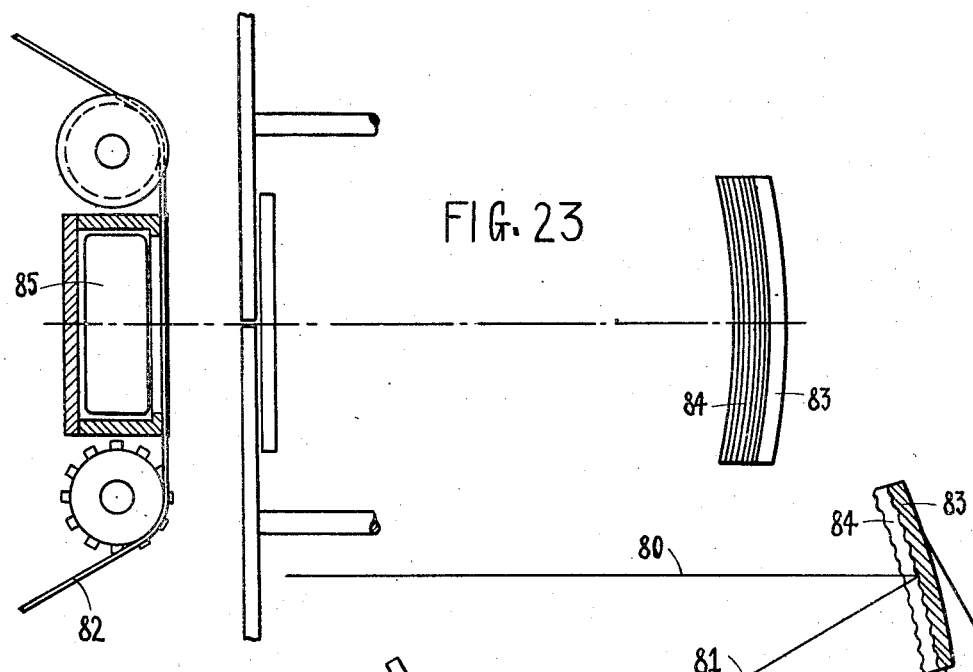
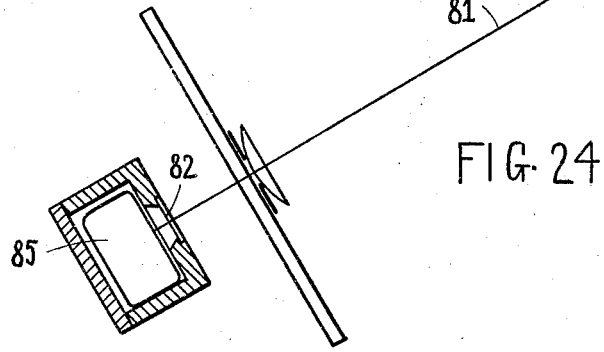
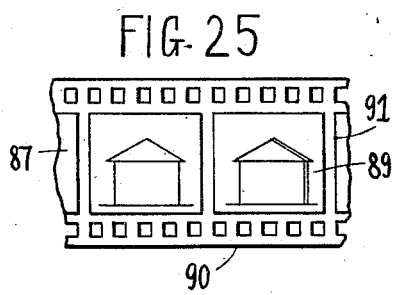
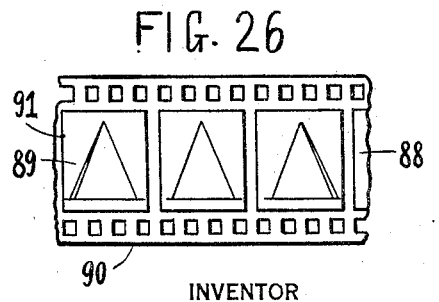
INVENTOR
Ernest Wildhaber Patented Nov. 14, 1933

1,935,220

UNITED STATES PATENT OFFICE 1,935,220

METHOD OF AND MEANS FOR PROJECTING PICTURES

Ernest Wildhaber, Brooklyn, N. Y.

Application July 5, 1928. Serial No. 290,626

13 Claims. (Cl. 88—16.6)

The present invention relates to methods of and means for projecting pictures, and particularly to methods and means for simultaneously projecting a plurality of pictures.

One object of the present invention is to effect a practical and inexpensive projection of stereoscopic pictures, in a manner to make such pictures visible in full relief to a plurality of persons using only their bare eyes, and to dispense with colored spectacles or other means to be held before the eyes.

A further important object is to effect projection of stereoscopic moving pictures in a manner that no individual means are required by the spectators. A still other object is to effect projection of colored stereoscopic pictures. Moreover novel and efficient means for projecting pictures shall be devised, which may be used for projecting stereoscopic pictures as well as ordinary moving pictures.

Another aim of the present invention is to effect a more direct projection of moving pictures and of stationary pictures than hitherto practiced, eliminating the diffusing action of a conventional screen. A still other aim is to provide a picture projection which permits to light the pictures with increased intensity.

Other objects are to provide lenses and concave mirrors of novel structure, and suited to be used in place of screens in picture projection according to the present invention.

Another purpose is to devise ways and means supplementing the inventions disclosed in my application entitled "Method of projecting pictures" filed June 23, 1927, Serial No. 200,894, and in my companion application entitled: "Method of and means for projecting pictures", filed July 5, 1928, Serial No. 290,625.

Further aims will appear in the course of the specification and from recital of the appended claims.

My invention will be explained with reference to the accompanying drawings, which illustrate some embodiments of it, and in which Fig. 1 is a diagrammatic plan view, partly a section, of a device for projecting moving pictures in accordance with the present invention.

Fig. 2 is a section along lines 2—2 of Fig. 1.

Fig. 3 and Fig. 4 are views of a single lens and of a pair of lenses suited to diffuse light in one direction, in accordance with the present invention. Lenses of this character may be used in place of a screen.

Fig. 5 is a diagram illustrative of a general principle of the present invention, and explanatory of the zones of visibility of pictures projected in accordance with the present invention.

Fig. 6 is a diagram further illustrative of said zones of visibility.

Fig. 7 and Fig. 8 are diagrams illustrative of diffusion in one direction, in connection with reflecting surfaces or mirror surfaces, as made use of in the present invention.

Fig. 9 and Fig. 10 are diagrams illustrative of diffusion in one direction, as applied to refractory materials, such as glass.

Fig. 11 is a section through the wavy surface of a reflecting member further illustrative of diffusion in one direction.

Fig. 12 and Fig. 13 are each a sectional view through the wavy surface of a refractory member or of a reflecting member, formed and used in accordance with the present invention, the sections being taken at right angles to the direction of the surface waves. The two figures illustrate two slightly modified forms of waves.

Fig. 14 is a diagrammatic plan view of a concave mirror used for picture projection in accordance with my invention, shown in relation with zones of visibility of projected pictures, and illustrative of a way of determining the direction of the minute waves of the mirror surface.

Fig. 15 is a section along lines 15—15 of Fig. 14.

Fig. 16 is a view of a lens illustrative of a way of determining the direction of the minute waves, as may be provided on one of its surfaces in accordance with the present invention.

Fig. 17 is a front view of the lens indicated in Fig. 16.

Fig. 18 is a front view of the mirror indicated in the Figures 14 and 15, the view being taken at right angles to its surface.

Fig. 19 and Fig. 20 are front views of rectangular mirrors or lenses containing wavy surfaces, the two figures corresponding to slightly modified dispositions of the waves of said surfaces.

Fig. 21 and Fig. 22 are respective views of a mirror and of a lens respectively having structures in accordance with the present invention, such as may be used in a picture projection of the character disclosed.

Fig. 23 is a diagrammatic plan view, partly a section, of a device for projecting moving pictures in accordance with the present invention, using a concave mirror of novel structure in place of a conventional screen.

Fig. 24 is a side view, partly in section, corresponding to Fig. 23.

Fig. 25 and Fig. 26 are views of films or picture strips, such as may be used in accordance with the present invention for effecting stereoscopic pictures.

In Fig. 1 and Fig. 2, the numeral 11 denotes a film or picture strip, which is fed at a uniform rate by a toothed roll 12, whose teeth 13 engage with holes provided on said picture strip. Film 11 is fed over a guiding roll 14 and then passes in front of an aperture 15, which contains a recess suited to guide film 11. Back of aperture 15 a source 16 of uniform light is disposed, which in the instance illustrated consists of an incandescent tube 17 of small diameter, enclosed in a glass tube 18. Tube 17 is of a character to emit light uniformly from its surface, when electric current is sent through it by means of wires 19. Glass tube 18 contains a surface 20 made reflecting by a suitable metal cover, and contains such curvature as to form a real image 17' (Fig. 2) of tube 17 adjacent an aperture 21, through which picture projection is effected. Through such or a similar arrangement it is possible to emit a great amount of light through a narrow aperture, in a manner that in every point of said aperture light is received uniformly from all the points of a picture which is being projected.

In front of the picture film rotary glass disks 23, 24 are provided, which are rotatable on axes 25 and which contain lenses extending along spirals. The said lenses contain constant circular profiles in planes perpendicular to said spirals. The structure and position of disks 23, 24 is described with more detail in my companion application, Serial No. 290,625, filed July 5, 1928.

A cylindrical lens 26 is disposed adjacent the rotary disks 23, 24, and extends in a direction parallel to the motion of film 11. The spiral lenses extending on disks 23, 24 together with cylindrical lens 26 constitute equivalents of a series of spherical lenses, which are disposed in front of the individual pictures in a manner to project said pictures to the same area. This object is attained in known manner, when the pitch of the pictures on film 11 and the pitch of said equivalent lenses are in the same proportion to each other as the distances of the film and of the said lenses from the area of projection.

The disks 23, 24 are rotated on their axes in timed relation to the motion of the film, and together with stationary cylindrical lens 26 constitute the equivalents of spherical lenses moving parallel to the direction of motion of the said film. The ratio of the motions is such, that the equivalent spherical lenses move a distance equal to their pitch, when the film moves a distance equal to its own pitch, that is to say when the film advances by one picture.

Under such conditions a picture of film 11 remains projected to the same area (28) as it moves at a uniform rate past aperture 15.

Further details of the projection mechanism may be had in my companion application above referred to. The drawings of the present application are confined to the essentials of the projection mechanisms, and omit for instance to show means for eliminating stray rays, as such means may be provided by applying the customary knowledge of the art.

A plurality of pictures disposed on strip 11 are simultaneously projected to a lens 28 of a novel structure hereafter described. An image of each picture is thereby formed on or adjacent lens 28. The lens will not alter the size or position of the said image or not substantially alter it. In other words the (secondary) image formed by lens 28 out of the image projected to said lens coincides or approximately coincides with said projected image.

All the rays forming said image of a picture disposed on strip 11 pass through the aperture, which is formed partly by aperture 21 which extends lengthwise of lens 26 and partly by a spiral aperture which follows a spiral lens of a disk 23, 24, in a manner to leave only the central part of said spiral lenses transparent. The parts 30 on the sides of the circular profiles of said spiral lenses are namely made opaque by covering them with an opaque layer. The composite aperture referred to occurs at the crossing of aperture 21 with a spiral aperture.

Let it first be supposed that lens 28 is of conventional character and contains smooth surfaces. When containing smooth surfaces, lens 28 will form an image of said composite aperture, and inasmuch as every point of said composite aperture receives rays from every point of a picture on strip 11, every one point of the image of said composite aperture also receives rays from every point of a projected picture. In other words, the image of a projected picture is perceptible in its entirety from all the points of an area, which is the image of said composite aperture, as formed by lens 28, and from points in front of and back of said area. Moreover no part of said image is perceptible from any point on the side of said area.

As the different pictures of a strip or film 11 are simultaneously projected through different composite apertures, their images are perceptible from different areas, namely again from the areas which are the images of said composite apertures as formed by lens 28. The said areas are preferably disposed in a horizontal row, an aim which can be readily accomplished by providing a horizontal path of film 11 in front of aperture 15.

The said areas of visibility are of the same general shape as the said composite apertures, and would frequently contain a height equal to their width. As will be evident hereafter, it is very desirable to enlarge the areas of visibility of the individual projected pictures and especially to multiply the height of said areas. If so desired they may also be enlarged sidewise, but preferably not so much that adjacent areas overlap. When enlarged in vertical direction in the proportion stated, said areas assume the shape of zones, namely of vertical zones of visibility.

Enlargement in vertical direction of the zones of visibility may be effected by altering the minute configuration of one side or both sides of lens 28, in a manner to provide small waves 31, which extend in horizontal direction across lens 28. The said waves form part of the lens itself and are very small as compared with the surface of the lens, much smaller than indicated in the drawings. The action of the wavy surface of lens 28 will be fully explained hereafter. Instead of providing a lens 28 having waves provided on a substantially plane surface, a lens 32 as indicated in Fig. 3 may be provided, if so desired, or a pair of lenses 33, 34, as indicated in Fig. 4, or various other combinations. Lens 32 contains waves 35 disposed on a spherical surface 36, likewise lens 34 contains waves disposed on a spherical side 37, whereas the companion lens 33 contains two smooth spherical sides. The purpose of structures as shown in Fig. 3 and Fig. 4 is to increase the concentrating power of the lens to which the pictures are projected.

If so desired, a separate plate may be disposed adjacent a lens, and provided with a wavy surface as described.

A somewhat broader aspect of the present invention will now be described with reference to the diagram Fig. 5, where 40 denotes a picture strip or film, of which simultaneously a plurality of pictures are projected to lens 41 through openings 42. Projection is effected by means of spherical lenses 43 or preferably by means of equivalents of spherical lenses 43. Such equivalents may be of any desirable structure, of which one has been explained with reference to Fig. 1 and Fig. 2. Lens 41 contains a wavy side 44 containing small waves extending in horizontal direction across the face of said lens. Images 42' of openings 42 are formed by lens 41. When openings 42 are circular apertures, their images 42' as formed by a smooth lens 41 are also circular. This is illustrated in a general manner by Fig. 6, where the circles 45 are the images of said openings (42). The horizontal waves of side 44 of lens 41 increase the vertical extent of images 42', which appear therefore in fact as vertical zones 46.

Film 40 may be fed interruptedly, if so desired, that is to say it may be periodically moved by one picture. In this case lenses 42 may be kept stationary.

Preferably however film 40 is moved continuously and at a constant rate, as described also with reference to the embodiment indicated in Fig. 1 and Fig. 2. The lenses 43 or their equivalents are then also moved at a constant rate, namely at such a rate, that a picture is continuously projected to the same area on or adjacent lens 41. With the lenses are also moved the openings 42 or their equivalents, and consequently also the images 42' of said openings. The zone 46 (Fig. 6) of visibility of any individual projected picture is thereby moved continuously in one direction from one side to the other. The pictures are therefore successively visible from a single zone.

The principles of stereoscopic vision will now be briefly explained, which are made use of in a preferred embodiment of the present invention. Detailed explanation of such stereoscopic vision is given in my application above referred to, Serial No. 200,894.

Stereoscopic vision in full relief is known to require that the two eyes of a spectator perceive two slightly differing pictures, namely two pictures differing just so much as the actual vision of objects. This requirement has hitherto presented great difficulties to the projection of moving pictures. For it is clearly evident, that a picture projected to a screen of known character will be visible to both eyes, unless special provision is made. Such provision may consist in the use of individual means by each individual spectator, such as the use of individual rotary shutters, or of colored spectacles, and is found to be a very serious drawback.

Pictures projected in accordance with the present invention are however not simultaneously visible from every point of a projection space, but only from narrow vertical zones, as has been described. This feature removes the principal difficulty experienced in projecting stereoscopic moving pictures, inasmuch as restriction of visibility of an individual picture to a narrow zone opens up the possibility of projecting different pictures to the two eyes of the spectators and broadly to project pictures in a manner that they are not simultaneously seen with both eyes: Vision simultaneously perceived with the two eyes does not coincide when pictures are projected according to this important embodiment of the present invention.

Preferably all the pictures of a strip or film are made visible to either eye of a spectator, but the individual pictures are made visible to either eye during different periods or moments. Although this feature imposes a restriction hereafter described to the nature of the stereoscopic pictures used, it results in such a simple, satisfactory and inexpensive solution that it is by far preferred from any other solution I am aware of.

Known stereoscopic pictures to be reproduced with full relief are ordinarily filmed with a double camera having two objectives maintained horizontally displaced to each other. The two objectives are then made to picture the differing views as experienced by the two eyes of a spectator. Let it be imaged at first that the objects to be pictured are stationary. It is then immediately realized, that an identical pair of stereoscopic pictures may be obtained with a camera containing a single objective, namely when the pictures are successively taken in a manner that the objective of the single camera successively assumes the positions occupied by the two objectives of said double camera.

Instead of making only one pair of stereoscopic pictures, the process can be continued, and the recording camera may be continuously displaced in one direction while continuously taking pictures. The result thus obtained is equivalent to the result obtained with a double camera, which is moved in such manner in one direction that in each position of exposure one of its two objectives coincides with the preceding position of the other objective. In other words the double camera would be moved in such manner as to imitate an observer, who is moved sidewise and takes glimpses at regular intervals, which correspond to a distance covered equal to the distance between his eyes. As the said double camera takes double exposures in each of said positions, namely one exposure with each of its objectives, the pictures so taken will contain doubles, that is to say each picture is identically taken twice.

During reproduction of a film of this character as taken by said double camera, the left eye of a spectator will see pictures identical with those which the right eye sees in an adjacent position. The objects will appear in full relief, in a manner that the sensation felt by a spectator is one of relative travel with respect to the objects pictured.

Instead of viewing the picture pairs actually taken in the described manner by said double camera, which contain doubles, the said doubles may be omitted, and each picture may then be successively viewed with the right eye and with the left eye. It will be understood by those skilled in the art, that exactly the same result may thus be arrived at. This procedure or a related procedure is preferably used in accordance with the present invention. It permits to reduce the number of pictures into one half as compared with the above described use of a double camera.

The remarks thus far made with respect to stereoscopic vision relate to stationary objects. They require however no or only a slight modification when considering pictures of moving objects.

In this preferred case the pictures may also be taken successively with a single camera, which moves continuously in one direction, and the pictures are reproduced in a manner that each picture is successively seen by the two eyes of a spectator, preferably during non overlaping periods.

One way of proceeding is to take and reproduce pictures in a manner that a picture is first made visible to one eye and none to the other eye. In the subsequent period the same picture is made visible to the other eye and none to the first said eye. Thereafter a subsequent picture is made visible to the first said eye and then to the other said eye, and so on. The pitch of the vertical zones of visibility 46, Fig. 6, is then made about equal to double average eye distance.

The impression obtained by a spectator is again that of continuous motion in one direction relatively to the objects pictured. The latter may be made to appear in full stereoscopic relief when the disposition is held along the lines described for stationary objects.

The feature of relative motion contained in the stereoscopic films used and projected in accordance with the present invention is found to be rather an asset in several varieties of pictures, for instance in travel pictures, often also in news pictures, and others, and can be complied with in all pictures.

Moreover stereoscopic cartoons, stereoscopic drawings and all pictures formed by hand work and suited to be reproduced as stereoscopic moving pictures present no difficulties in complying with the requirements imposed upon stereoscopic films projected in accordance with the present invention.

In all such and other applications of stereoscopic moving pictures the present invention permits to reduce the number of pictures used and to do away with hitherto existing complications in viewing the pictures. It is also noted that the present invention permits the use of colored stereoscopic pictures as well as of one color pictures.

Diffusion of light in one direction will now be explained. Such diffusion is preferably provided on or adjacent the lens or mirror, to which the pictures are projected in accordance with the present invention.

In Fig. 7, the numeral 50 denotes a portion of a reflecting surface or a mirror surface, and 51 denotes its normal or perpendicular at a mean point 52. As well known, an incoming ray 53 is reflected in such manner by surface 50, that the outgoing ray 54 includes the same angle with normal 51, as the incoming ray 53. Moreover rays 53, 54 and normal 51 are disposed in the same plane.

We will now consider the same ray 53 when it hits a surface 50′, see Fig. 8, which is turned about a line 52 perpendicular to the plane of the drawing as compared with surface 50, Fig. 7. Again the reflected ray 54′ includes the same angle with the surface normal (51′) as incoming ray 53. Ray 54′ is therefore turned about line 52 as compared with ray 54 of Fig. 7 by an angle equal to the double angle, by which surface 50′ is turned as compared with surface 50. This is indicated in Fig. 7, in which ray 54′ is shown in dotted lines.

These remarks hold true not only when the rays 53 and 54, or 53 and 54′ are disposed in the plane of the drawing, that is to say in a plane perpendicular to the turning axis 52, but also when the planes of said rays are disposed at an angle to the plane of the drawing. In this case the lines 53, 54, 54′ are the projections of the actual rays. The plane constituted by actual rays 53, 54 and normal 51, Fig. 7, intersects then the drawing plane along said normal 51, as will be readily understood by those familiar with mathematics, and the angles included with normal 51 by rays 53, 54 are also equal in the projection to the plane of the drawing. The same is true for the rays 53, 54′ and normal 51′ of Fig. 8. The projected ray 54′ is again turned about a line 52 as compared with projected ray 54 of Fig. 7, namely by an angle double the angle by which surface 50′ is turned as compared with surface 50.

These results may be summed up in the following words:

Any ray (54) reflected by a surface (50) may be turned about an axis (52) tangent to said surface, by turning said surface about said axis.

Analogous results are obtained for refraction, as will be presently explained:

A ray refracted at the surface of a refractory body may be turned about an axis tangent to said surface, by turning said surface about said axis.

In Fig. 9 an incoming ray 55 is shown refracted at the surface of a glass body 56 or broadly of a refractory member 56, in a manner that it continues as a ray 57. Rays 55 and 57 are known to be inclined to normal 58 by angles whose sines are in a constant proportion to each other, the said proportion being a characteristic of the material of body 56. In the applications used in accordance with the present invention, the angles between the rays (55) and the normals (58) of refractory members are comparatively small, so that the sines of said angles can be considered as equivalents of the arcs measures of the angles themselves, in analogy with conventional mathematical treatment of lenses. The angles included by normal 58 with incoming ray 55 and with refracted ray 57 are then in a constant proportion to each other.

Ray 55 is refracted as a ray 57′ (see Fig. 10) at the surface of a body 56′, which is turned about a line 52 as compared with body 56 of Fig. 9. Refracted ray 57′ is similarly turned about line 52, which is perpendicular to the drawing plane.

Again the remarks hold also true when the rays 55 and 57 are inclined to the drawing plane, as will be readily understood. In this case normal 58 and normal 58′ again constitute the intersection lines between the drawing plane and the planes of rays 55, 57, or 55, 57′ respectively.

The principles described with reference to Figures 7 to 10 are made use of in accordance with the present invention for effecting diffusion in one direction, as will now be explained.

In Fig. 11 the lines 53, 53′, 53″ denote incoming rays falling on a wavy mirror surface 60, whose waves extend in a direction perpendicular to the plane of the drawing. The actual waves are very fine and are shown much magnified. Similarly the considered rays 53, 53′, 53″ are in reality so close together, that they might almost be considered as a single ray. The said rays are seen to fall upon different portions of the wave profile, namely on portions which contain different inclinations and different normals. The inclinations of said portions differ from each other in the same manner as the inclinations of the surfaces 50, 50′, Fig. 7 and Fig. 8, namely by containing normals (such as 51) which are turned relatively to each other about a line extending in the direction of the waves, that is to say perpendicular to the drawing plane. In consequence the reflected rays 61, 61′, 61″ are subject to the laws derived with reference to Fig. 7 and Fig. 8: The rays 61′ and 61″ are turned about axes perpendicular to the drawing plane, as compared with central ray 61, regardless of whether rays 53, 53′, 53″ lie in the plane of the drawing or not.

Surface 60 can be considered as a small portion of a plane mirror or of a concave mirror. If the mirror surface were smooth, that is to say if it were without waves, the considered portion would form a point image or substantially a point image of every point outside of it. When provided with the described minute waves, the image formed of any outside point is a line, namely a line perpendicular to the direction of the waves, or substantially a line, such as might be formed by turning the point image formed by an imaginary smooth mirror surface about an axis parallel to the direction of the actual surface waves and contained in said surface or tangent to said surface.

A further step performed according to the present invention is to harmonize the different portions of a mirror surface, in a manner to obtain distortion or diffusion in substantially the same direction from all portions of said surface. This will be described with reference to the Figures 14, 15 and 16.

What has just been said about the diffusion of wavy mirror surfaces, also holds true for the diffusion of refractory surfaces, which contain waves.

In either case the degree of diffusion depends on the shape of the waves, and especially on their maximum inclination.

Two different forms of wave profiles are indicated in Fig. 12 and Fig. 13. The latter profile is preferred in many cases, as it may be made at less cost with known means. In either case the maximum inclination 62 of the waves is preferably made smaller than 30° and frequently much smaller than that amount.

In Fig. 14 and Fig. 15, the numeral 64 denotes a spherical mirror to be provided with a wavy surface, and point 65 denotes the location of central spectators. The zones of visibility are supposed to occupy a curved line 66, whose tangent at point 65 is denoted with 67. It is understood that the projected pictures are also visible in front of said zones and back of said zones, and that it makes practically no difference, whether they are supposed to be on curve 66 or on tangent 67.

To determine the direction of the described waves, in any point 68 of the spherical general surface of mirror 64, it is kept in mind from what has been said above, that the direction of the waves is also the axis of diffusion or distortion, and that the points of the areas disposed substantially on tangent 67 should be so distorted or diffused as to form substantially vertical lines, or lines contained substantially in vertical planes. It can be readily proved with known means of mathematics, that this aim is attained, when the waves are made to extend along lines such as line 70, which lies on a plane containing point 68 and tangent 67. Broadly, the aim set is attained, when the waves extend along lines 70, 71, 72, which are the intersection lines of the spherical general mirror surface with planes containing tangent 67. These lines are circles, whose planes are inclined to the central normal 73 of the spherical general mirror surface.

A front view of such wave lines (71) of a spherical mirror 64 is afforded by Fig. 18. The mirror may be round as indicated in the drawing, or of rectangular shape, if so desired. In use, the mirror is so positioned, that the general direction of its waves is horizontal.

The direction of the waves to be provided on a lens 75 may be determined in a manner analogous to the one described, see Fig. 16. Here again the waves extend along planes containing the above said tangent 67. In other words the waves extend along the intersection lines of the general lens surface with planes containing tangent 67. In the instance illustrated, the waves extend along parallel and straight lines 76, see Fig. 17.

Lens 75 is neither confined to a circular form, but may also be made rectangular, if so desired.

Two front views of rectangular mirrors 78, 79 are indicated in Fig. 19 and Fig. 20. Mirror 78 contains waves extending along lines determined in the manner described with reference to Fig. 14 and Fig. 15. The waves of mirror 79 extend along circles 80, whose planes are all parallel. The central circle 71 is determined in the manner already described with reference to Fig. 14 and Fig. 15, and the planes of the other circles are drawn parallel to the plane of circle 71. In Fig. 15 the plane of such a circle 71' is indicated in dotted lines 71''.

A mirror 79 contains practically the same characteristics as mirror 78 of Fig. 19, and presents certain advantages in manufacture.

A perspective view of a concave rectangular mirror is shown in Fig. 21, and a perspective view of a lens diffusing light in one direction is afforded by Fig. 22.

Fig. 23 and Fig. 24 diagrammatically illustrate simultaneous projection of moving pictures to a concave mirror diffusing light in one direction, in accordance with the present invention.

Projection is effected at an angle, as indicated in Fig. 24, in which the drawing plane is a vertical plane, and in which line 80 indicates the horizontal direction. Fig. 23 is a diagrammatic plan view taken at right angles to inclined line 81, Fig. 24.

Projection proper may be effected in the same general manner as described with reference to Fig. 1 and Fig. 2. The images of the pictures of film 82 are formed adjacent mirror 83, which contains a wavy surface 84 of the character described. The said images may be viewed in the general direction of line 80.

In the embodiment outlined in Fig. 23 and Fig. 24 I have diagrammatically indicated a source of light 85 of a modified character, as compared with source of light 16 indicated in Fig. 1 and Fig. 2. Either modification may be used in either embodiment. Source of light 85 consists of a gas filled glass tube, suited to emit uniform light when electric current is sent through it. Tubes of this character are well known, so that further description is unnecessary.

The Figures 25 and 26 illustrate two slightly modified forms of stereoscopic films for simultaneous projection of a plurality of pictures in accordance with the present invention. Both films 87, 88 contain pictures 89 so disposed, that their vertical direction is perpendicular to the longitudinal direction 90 of the films. In other words the sides 91 are to be projected in vertical direction. The said disposition is a result of the horizontal film motion, as required in projecting stereoscopic moving pictures in accordance with the present invention, namely by simultaneously projecting a plurality of pictures made visible on restricted vertical zones only.

To effect full stereoscopic vision, the films 87, 88 moreover represent continuous relative motion in one direction between the spectators and the pictured objects, as has been already described. Film 88 further differs from conventional films in that its pictures contain a larger height than width.

Many changes and modifications may be made in my invention without departing from its spirit, by simply applying the established knowledge of the art.

For definition of its scope it is relied upon the appended claims.

What I claim is:

1. The method of projecting pictures, which consists in providing a picture strip, in simultaneously projecting a plurality of pictures of the same strip from different points to the same area, in rendering each of said pictures visible from a different and single zone separate from the zones of visibility of the other pictures, and in successively projecting each of said pictures from all of said different points.

2. In a device for projecting pictures, means for simultaneously projecting a plurality of pictures to the same area, screen means disposed at said area, the surface of said screen means containing fully reflective corrugations extending in one general direction across said area, said corrugations being optically smooth in the direction of their length, and said surface as a whole having a concave profile at least in said direction.

3. In a device for projecting pictures, in combination, screen means having a surface optically smooth along lines extending in one general direction and corrugated in a direction perpendicular to said lines, said screen means further comprising joint condensing means so as to be capable of forming real line images of points from which pictures are to be projected, and means for simultaneously projecting a plurality of pictures with separate light bundles to said screen means to form overlapping images thereon.

4. In a device for projecting pictures, in combination, screen means having a surface optically smooth along lines extending in a horizontal general direction and corrugated in a direction perpendicular to said lines, joint condensing means operatively connected with said screen means so that real line images may be formed of points from which pictures are to be projected, and means for simultaneously projecting a plurality of pictures with separate light bundles to said screen means to form overlapping images thereon.

5. In a device for projecting pictures, in combination, screen means having a reflective surface optically smooth along lines extending in one general direction and corrugated in a direction perpendicular to said lines, said lines being concave arcs, and means for simultaneously projecting a plurality of pictures with separate light bundles to said screen means to form overlapping images thereon.

6. In a device for projecting pictures, screen means having a reflective surface optically smooth along lines extending in one general direction and corrugated in a direction perpendicular to said lines, said lines being concave arcs, a plurality of objectives positioned to form overlapping images on said screen means and disposed in a line extending in said general direction.

7. The arrangement for projecting pictures, comprising screen means having a surface optically smooth along continuous and unbroken lines extending in one general direction and corrugated in a direction perpendicular thereto, said lines extending across the whole screen surface, condensing means operatively connected with said surface for concentrating light projected to said surface as a whole, and means for simultaneously projecting a plurality of pictures from different points to said surface.

8. The arrangement for projecting pictures, comprising screen means having a surface optically smooth along continuous and unbroken lines extending in one general direction and corrugated in a direction perpendicular thereto, said lines extending across the whole screen surface, the corrugations of said surface having a constant and curved profile, condensing means operatively connected with said surface for concentrating light projected to said surface as a whole, and means for simultaneously projecting a plurality of pictures from different points to said surface.

9. The arrangement for projecting pictures, comprising screen means having a reflective surface optically smooth along arcuate lines extending in one general direction and corrugated in a direction perpendicular thereto, said lines extending across the whole screen surface, and means for simultaneously projecting a plurality of pictures to said surface.

10. The arrangement for projecting pictures, comprising screen means having a reflective surface optically smooth along arcuate lines extending in one general direction and corrugated in a direction perpendicular thereto, said lines extending across the whole screen surface, and means for simultaneously projecting a plurality of pictures to said surface from points displaced relatively to each other, said points being displaced in a direction substantially parallel to said arcuate lines.

11. The method of projecting pictures, which consists in simultaneously projecting a plurality of pictures from different points to the same area, said pictures showing differing views of the same objects, in reconcentrating the rays which leave said area as a whole to render each of said projected pictures visible from a single space separate from the space of visibility of the other projected pictures, and in diffusing in one general direction the rays leaving the elements of said area, to shape said spaces into oblong zones.

12. The method of projecting pictures, which consists in providing a picture carrier containing differing views of the same objects, in simultaneously projecting a plurality of pictures of the same picture carrier from different points to the same area, in reconcentrating the rays which leave said area as a whole to render each of said projected pictures visible from a single space separate from the space of visibility of the other projected pictures, and in diffusing in one general direction the rays leaving the elements of said area, to shape said spaces into oblong zones.

13. The method of projecting pictures, which consists in providing a picture carrier containing differing views of the same objects, in simultaneously projecting a plurality of adjacent pictures of the same picture carrier from different points to the same area, in reconcentrating the rays which leave said area as a whole to render each of said projected pictures visible from a single space separate from the space of visibility of the other projected pictures, and in diffusing in a vertical direction the rays leaving the elements of said area to shape said spaces into vertical oblong zones.

ERNEST WILDHABER.